(12) United States Patent
Schabasser et al.

(10) Patent No.: US 11,300,006 B2
(45) Date of Patent: Apr. 12, 2022

(54) GUIDE VANE BEARING AND MAINTENANCE METHOD

(71) Applicant: VOITH PATENT GMBH, Heidenheim (DE)

(72) Inventors: Martin Schabasser, Pfaffing (AT); Thomas Popelka, Melk (AT)

(73) Assignee: Voith Patent GmbH, Heidenheim (DE)

( * ) Notice: Subject to any disclaimer, the term of this patent is extended or adjusted under 35 U.S.C. 154(b) by 453 days.

(21) Appl. No.: 16/480,401

(22) PCT Filed: Dec. 19, 2017

(86) PCT No.: PCT/EP2017/083427
§ 371 (c)(1),
(2) Date: Jul. 24, 2019

(87) PCT Pub. No.: WO2018/141456
PCT Pub. Date: Aug. 9, 2018

(65) Prior Publication Data
US 2019/0353050 A1    Nov. 21, 2019

(30) Foreign Application Priority Data

Feb. 2, 2017 (DE) .......................... 102017102033.0

(51) Int. Cl.
*F03B 3/18* (2006.01)
*F01D 25/16* (2006.01)
(Continued)

(52) U.S. Cl.
CPC .............. *F01D 25/16* (2013.01); *F01D 9/042* (2013.01); *F03B 3/183* (2013.01); *F03B 11/006* (2013.01);
(Continued)

(58) Field of Classification Search
CPC .......... F03B 3/183; F03B 11/006; F03B 11/06
See application file for complete search history.

(56) References Cited

U.S. PATENT DOCUMENTS

| 1,817,654 A | * | 8/1931 | Terry | ...................... F03B 3/183 |
| | | | | 251/307 |
| 4,203,703 A | * | 5/1980 | Koeller | ................... F03B 3/183 |
| | | | | 415/113 |

(Continued)

FOREIGN PATENT DOCUMENTS

| CH | 277775 A | 9/1951 |
| EP | 2993365 A1 | 3/2016 |

(Continued)

OTHER PUBLICATIONS

International Search Report of PCT/EP2017/083427, dated Mar. 4, 2018.

*Primary Examiner* — Ninh H. Nguyen
(74) *Attorney, Agent, or Firm* — Davidson, Davidson & Kappel, LLC

(57) ABSTRACT

A guide vane bearing for a hydraulic machine is provided, which may be serviced from the side of the water flow path, and a method for installing and removing a bearing of this type. The guide vane bearing includes a bearing support and a layer of bearing material and at least three segments, which are separately connectable to the bottom ring of the hydraulic machine, each segment including one part of the bearing support and one part of the layer of bearing material, and a joint between the segments being obliquely formed with respect to the bearing axis, so that one segment has a wedge shape, and the bearing furthermore including a bearing seal, and the bearing seal being rotatably fixedly connected to the trunnion of the guide vane, and the bearing support including a surface, which is designed as a running surface for the lip of the bearing seal.

9 Claims, 4 Drawing Sheets

(51) Int. Cl.
*F01D 9/04* (2006.01)
*F16C 17/02* (2006.01)
*F16C 33/04* (2006.01)
*F16C 33/74* (2006.01)
*F16C 43/02* (2006.01)
*F03B 11/00* (2006.01)
*F03B 11/06* (2006.01)

(52) U.S. Cl.
CPC .............. *F03B 11/06* (2013.01); *F16C 17/02* (2013.01); *F16C 33/046* (2013.01); *F16C 33/74* (2013.01); *F16C 43/02* (2013.01); *F05D 2240/50* (2013.01); *F16C 2360/00* (2013.01)

(56) References Cited

U.S. PATENT DOCUMENTS 4,277,221 A * 7/1981 Kanger .................... F03B 3/183
                                                                                   415/160
6,042,337 A * 3/2000 Thyberg ................ F03B 11/006
                                                                                  416/146 A

FOREIGN PATENT DOCUMENTS

GB           2509365 A     7/2014
JP           S6010885 U    1/1985

* cited by examiner

GUIDE VANE BEARING AND MAINTENANCE METHOD

The present invention relates to a guide vane bearing for a hydraulic machine and a method for installing and removing a bearing of this type.

BACKGROUND

To regulate the through-flow, hydraulic machines, such as turbines, pumps or pump turbines, may include a guiding apparatus, which includes a large number of movable guide vanes. The movable guide vanes extend between two rings and are movably supported therein by the guide blade bearing. One of the rings includes the means for actuating the guide vanes, i.e. means with the aid of which they are rotatable around their axis. This ring is usually referred to as the regulating or control ring. The ring situated opposite the control ring is referred to as the bottom ring, because this ring is situated on the bottom in hydraulic machines having a vertical rotation axis.

SUMMARY OF THE INVENTION

The present invention relates generally to the guide vane bearings in the bottom ring. It should be noted, however, that the present invention is not to be limited to hydraulic machines having a vertical rotation axis. The term, bottom ring (=the ring situated opposite the control ring), is used only to avoid awkward wordings. It is clear that the generic guide vane bearings are radial bearings.

To install and remove guide vane bearings in the bottom ring, e.g. for service purposes, either accessibility from outside the water flow path must be provided or the relevant guide vane must be withdrawn from the guide vane bearing, which is generally possible only if the cover of the hydraulic machine is disassembled. The first option requires a great deal of space, so that the hydraulic machine must be provided with a correspondingly large design, and the second option makes for an extremely complex service of the bearings. An object of the present invention is to provide a guide vane bearing for a bottom ring and a method for the installation and removal thereof, which does not require either accessibility from outside the water flow path or the disassembly of the cover of the hydraulic machine to install and remove the bearing. Due to the use of bearings according to the present invention, new hydraulic machines may be provided with a more compact design, the future service complexity in the case of bearing wear not requiring a disassembly of the cover of the hydraulic machine. The bearings of the present invention may be installed and removed from the water side.

A generic guide vane bearing and a method for the installation and removal thereof are known from CH 277775. However, the known approach requires large cavities in the bottom ring and a complex device for mounting the bearings. Moreover, an additional opening in the bottom ring is necessary, which must be closed by a cover. The present invention requires a much smaller cavity in the bottom ring and no special devices for mounting the bearings. The opening in the bottom ring is also omitted. The approach according to the present invention is therefore more economical and more compact than the known approach, and the method according to the present invention for installation and removal is easier to carry out than the known method.

The present invention provides a guiding apparatus for a hydraulic machine, including a control ring, a bottom ring, a guide vane, which includes a trunnion and a bearing for the radial support of the trunnion in the bottom ring, which may be serviced from the side of the water flow path of the hydraulic machine, the bottom ring including an opening for accommodating the bearing and the trunnion, and the bearing including a bearing support and a layer of bearing material, the bearing support being designed in such a way that it is connectable to the bottom ring, and the layer of bearing material being designed in such a way that it surrounds the trunnion. The bearing includes at least three segments, which are separately connectable to the bottom ring, each segment including one part of the bearing support and one part of the layer of bearing material, and a joint being obliquely formed between the segments with respect to the bearing axis, so that one segment has a wedge shape, the wedge-shaped segment being wider on the water-side edge in the circumferential direction of the bearing than on the opposite edge, and the bearing including a bearing seal, and the bearing seal being rotatably fixedly connected to the trunnion, and the bearing support including a surface, which is designed as a running surface for the lip of the bearing seal, and the extension of the opening in the bottom ring being dimensioned in such a way that the bearing seal may be installed when the segments of the bearing are not connected to the bottom ring and the trunnion is situated in the opening of the bottom ring.

The inventors were guided by the idea of providing the guide vane bearing with a segmented design.

BRIEF DESCRIPTION OF THE DRAWINGS

The approach according to the present invention is explained below on the basis of figures. Specifically.

DETAILED DESCRIPTION

Figure 1:
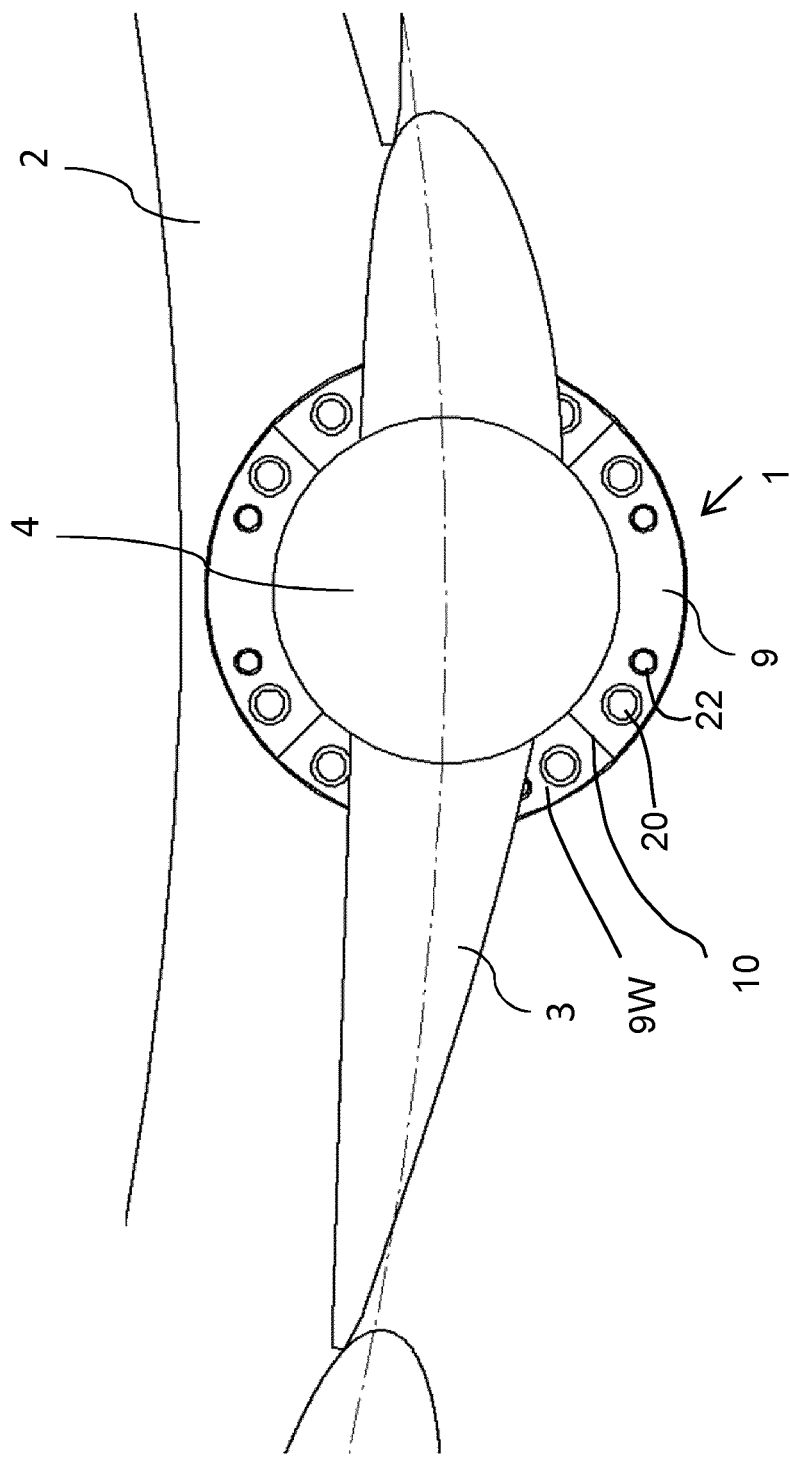
FIG. 1 shows a sectional view of a guide vane bearing according to the present invention transverse to the bearing axis in the installation position.

FIG. 1 shows a guide vane bearing according to the present invention in the installation position, in a top view below the cover. The guide vane bearing is designated by reference numeral 1 and the bottom ring by reference numeral 2. In addition, FIG. 1 shows a guide vane supported in bearing 1, which includes a guide vane blade, which is designated by reference numeral 3, and a guide vane trunnion, which is designated by reference numeral 4. It is apparent from FIG. 1 that bearing 1 is made up of four segments 9, one of which, designated as 9W is slightly wedge-shaped as will be described below. In the case of very thin guide vane blades 3, it is conceivable that a guide vane bearing 1 according to the present invention may also be made up of only three segments. However, four segments are generally needed to permit a service of the bearing from the water side. A further increase in the number of segments is, in principle, conceivable, but it is not advantageous for economical reasons. The bearing segments 9 have openings for screws 20 for screwing the segments on bottom ring 2. Additional openings 22 are also provided on the segments for removing the bearing.

Figure 2:
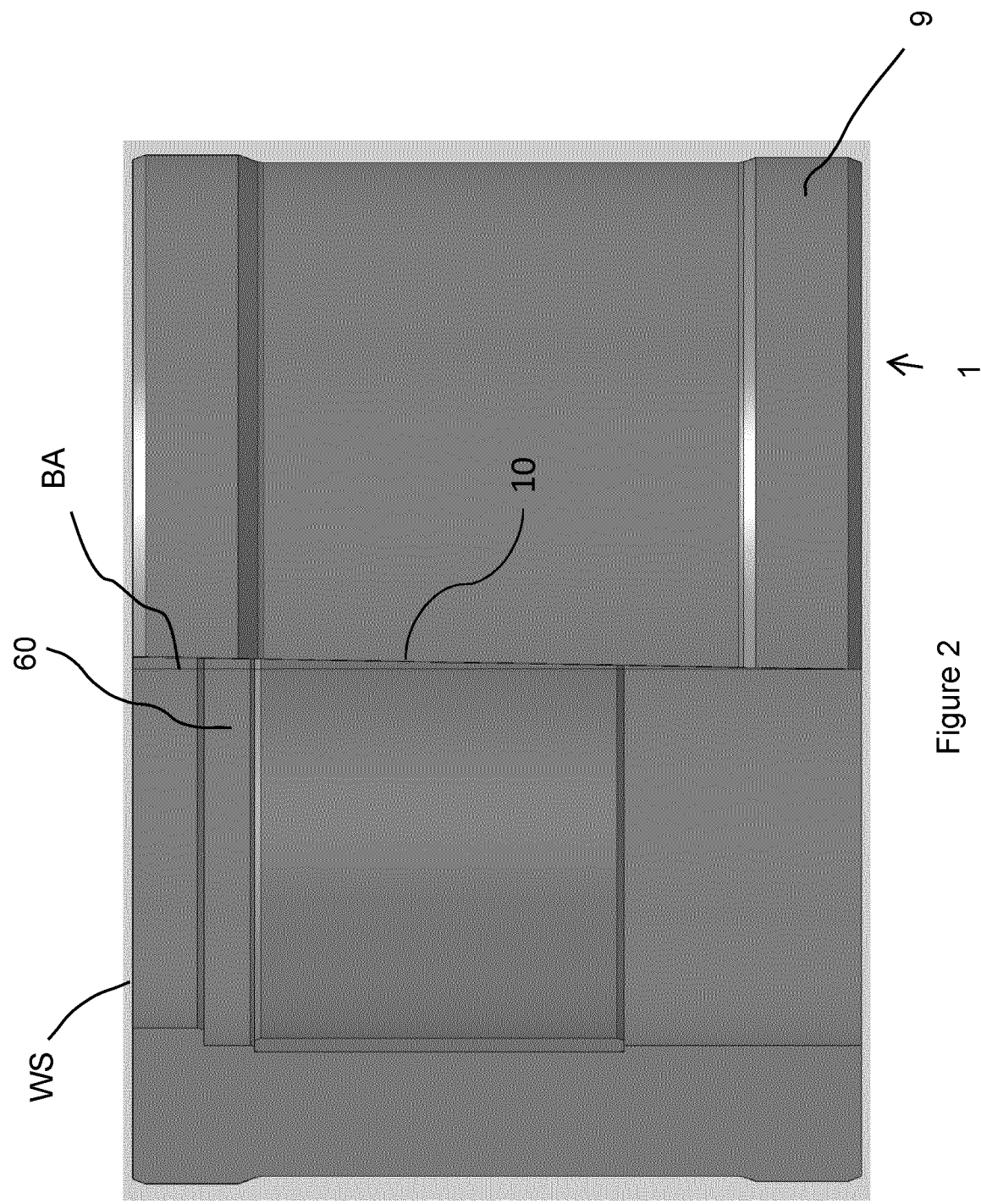
FIG. 2 shows a side view of the guide vane bearing according to the present invention.

FIG. 2 shows a side view of a guide vane bearing according to the present invention. The bearing segment 9W situated on the front left is not illustrated while the neighboring bearing segment 9 is. The joint between the non-illustrated segment in FIG. 2, segment 9W, and the segment 9 on the front right is designated by reference numeral 10. It is apparent that joint 10 runs slightly obliquely relative to the bearing axis BA. As a result, the non-illustrated segment on the water-side edge (upper edge WS in FIG. 2) is wider in the circumferential direction than the opposite edge (bottom edge in FIG. 2). This presupposes that the other joints run in parallel to the bearing axis. Due to this slightly wedge-shaped design in the described orientation, this segment may be easily removed as the first segment in the direction of the water flow path and installed as the last segment (see below). Within the scope of the present invention, this segment is referred to in short as the "wedge-shaped segment". In principle, other joints of this segment may also be positioned obliquely, so that the wedge shape is distributed to both joints. However, since an oblique joint is more complex to manufacture, and the oblique positioning of one joint is entirely sufficient, it is advantageous that only one joint of the bearing is provided with an oblique design so that for example the joint 10 is shown slightly obliquely due to the pushing of the non-illustrated bearing segment.

Figure 3:
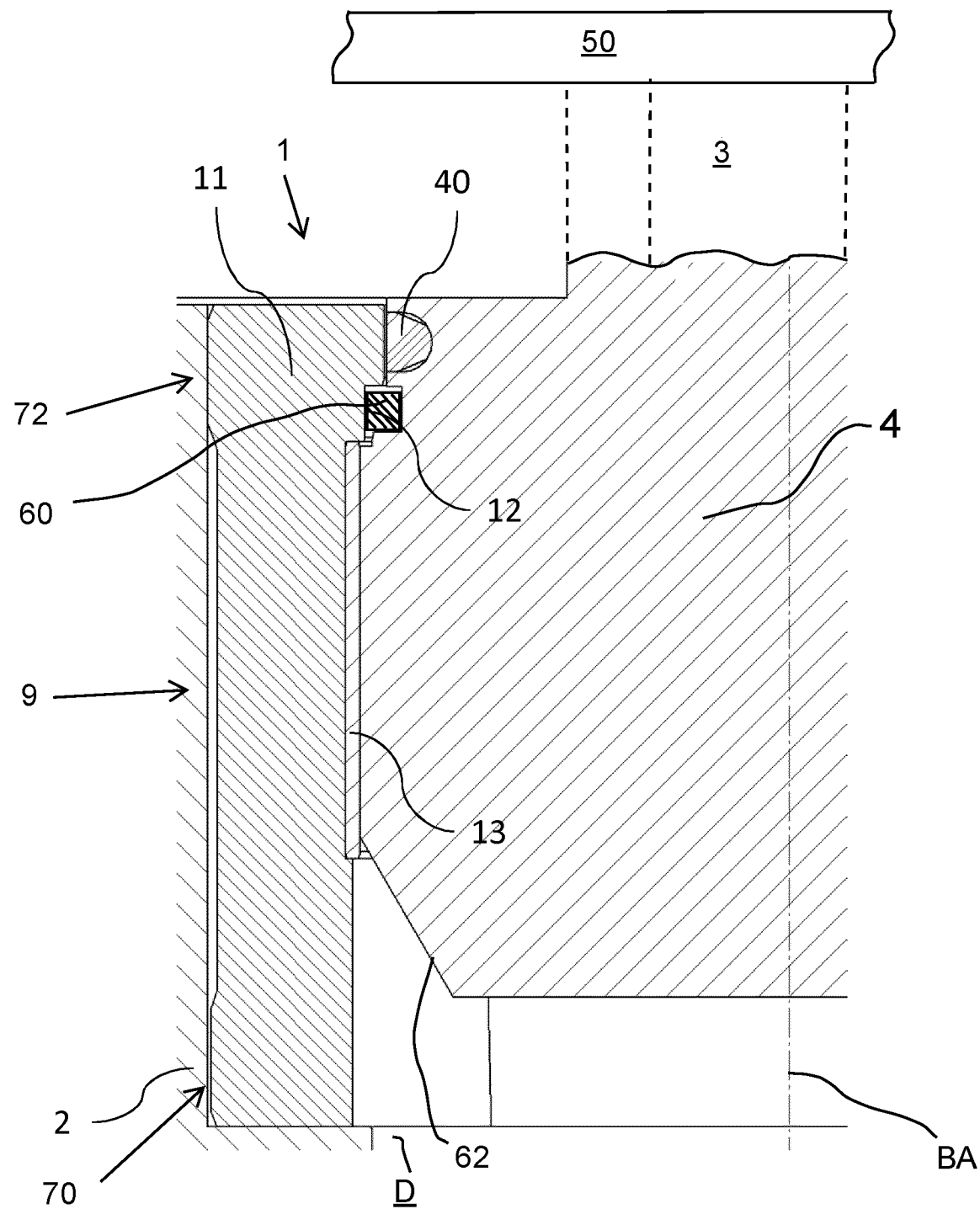
FIG. 3 shows a sectional view of the guide vane bearing according to the present invention along the bearing axis.

FIG. 3 shows a sectional view of part of an installed guide vane bearing according to the present invention along the bearing axis. The bottom ring is again designated by reference numeral 2 and the trunnion of the guide vane by reference numeral 4, while the control ring on the other end of guide vane 3 is shown schematically as 50. The bearing 1 includes a so-called bearing support, which is designated by reference numeral 11 (also shown in FIG. 2). A layer of bearing material, which is designated by reference numeral 13, is fastened on bearing support 11 and is situated between trunnion 4 and bearing support 11 in the installation position. Bearing material layer 13 is either fastened on bearing support 11 with the aid of radially running screws or glued thereto. Each segment of the bearing 1 encompasses one part of bearing support 11 and one part of bearing material layer 13. Trunnion 4 furthermore includes a relieving groove, which is designated by reference numeral 40. To prevent water from penetrating the bearing, the bearing according to the present invention also includes a bearing seal, visible in FIG. 2 as element 60 where the bearing segment has been removed. The bearing seal 60 is situated in the cavity in the vicinity of relieving groove 40. The bearing seal is fixedly mounted on trunnion 4 and rotates together with the guide vane 3, so that the seal lip slides over a surface of bearing support 11 designated by reference numeral 12. Surface 12 is the actual sealing surface. In conventional bearings, this is exactly reversed, i.e. the seal is fixedly connected to the bearing body, and the sealing lip slides along a surface of the trunnion. It is clear that bottom ring 2 has a correspondingly dimensioned opening for accommodating the bearing segments and trunnion 4. To mount the seal, a sufficiently large free space is required next to and below trunnion 4 (see below).

Figure 4:
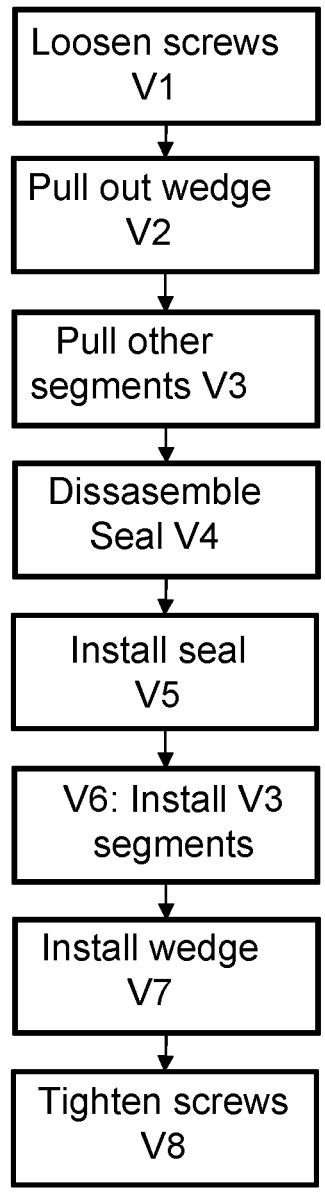
FIG. 4 shows a flowchart of the method according to the present invention for the installation and removal of the guide blade bearing according to the present invention.

FIG. 4 shows the flowchart of the method according to the present invention for removing and installing a guide vane bearing according to the present invention, e.g. for service of the bearing. All manipulations take place from the side of the water flow path. In the method step designated by V1, the screws 20 with which the bearing segments 9 are fastened on the bottom ring are loosened. To do this, it is necessary to rotate the guide vane, so that the covered screws are also accessible (cf. FIG. 1). The screws may be either completely removed or only loosened. In the latter case, the screws are completely removed in V2 and V3. In V2, the wedge-shaped segment is pulled out of the bottom ring. For this purpose, the wedge-shaped segment may have special bores, into which an extraction tool may be inserted. The wedge-shaped segment may be identified via these bores or other markings. However, the identification may also result from the installation position of the segments. In V3, the remaining segments are removed. A rotation of the guide vanes may also be helpful. In V4, the seal 60 is disassembled. This may take place destructively or similarly to the installation of the seal (see V5 below). The bearing is thus removed. In the case of service, the bearing material layers 13, for example, are now replaced and all parts are cleaned. The steps for installing the bearing then take place. In V5, the seal is installed. In the case of service, this would be a new replacement seal. For this purpose, the seal is threaded through beneath the trunnion. For this purpose, a minimum amount of space is required on the side and also below the trunnion as shown in FIG. 3. The dimensions of the bearing segments with regard to the radial extension as well as with regard to the axial length thereof and, of course, also the extension of the opening in the bottom ring, are determined thereby. A suitable, radial extension of the bearing segments is also provided for stiffness reasons. To make it easier to thread the seal, the latter may be preheated, so that it is flexible. A large tightening chamfer 62 (FIG. 3) on the lower end of the trunnion is also helpful. In V6, the segments removed in V3 are installed. The associated screws may already be inserted but without being tightened. A rotation of the guide vane may also be helpful here. In V7, the wedge-shaped segment is installed. Due to the wedge shape of this segment, the interspaces between the segments are closed during the insertion thereof. In V8, the screws 20 of the segments are tightened. A rotation of the guide vane may also be helpful here.

During the installation of the bearing segments, the latter slide on mating surfaces. Mating surfaces of the bearing segments are the joints, since they must be closed without clearance in the installed state. Due to the oblique position of one joint 10, a long sliding of the joints of this segment is avoided particularly during the most stressed installation of the last, i.e. the wedge-shaped, bearing segment. In addition, the removal of the segments is greatly facilitated thereby, of course, in particular since it may be expected that contaminated areas occur during the operation of the hydraulic machine, which make removal more difficult. The surfaces of the segments situated on the bottom ring in the installation position are also mating surfaces. To avoid a long sliding on these mating areas, the guidance on the outer diameter of the bearing may be divided into two short parts, i.e. the bearing support directly abuts the bottom ring only in the area of its axial ends (see FIGS. 2 and 3 and areas 70, 72 of FIG. 3—of course, the bottom ring could also equivalently have a recess and the bearing support be provided with a cylindrical design). Rustproof material is advantageously used as the material of the bearing support segments. Care must be taken at the joint locations of the running surface of the seal (surface 12 in FIG. 3) that no edges and burrs are present, so that a premature seal failure does not occur. A deburring and slight chamfering is advisable. When installing the bearing segments, care must furthermore be taken to avoid damaging the sealing lip. For this purpose, it may be advantageous that the bearing diameter is larger than the sealing diameter (cf. FIG. 3—the diameter of trunnion 4 abutting bearing material layer 13 is larger than the inner diameter of surface 12, which forms the running surface for the lip of the bearing seal).

It may be advantageous if the bearing is equipped with a drain D (see FIG. 3). Since the gap between the segments is not additionally sealed, leaks are not to be ruled out.

Finally, it should be noted that it is within the meaning of the present invention if the bearing support and the layer of bearing material of each bearing segment are manufactured from a single piece. This means that the bearing material is integral to the bearing support, or in other words: The bearing support is made entirely from bearing material. The material used must have reasonable sliding properties as well as sufficient strength properties. Appropriate plastics are useful as suitable materials for this purpose

What is claimed is:

1. A guiding apparatus for a hydraulic machine, the guiding apparatus comprising:
    a control ring;
    a bottom ring;
    a guide vane including a trunnion and a bearing for the radial support of the trunnion in the bottom ring, the bearing being serviceable from a side of the water flow path of the hydraulic machine,
    the bottom ring including an opening for accommodating the bearing and the trunnion, and the bearing including a bearing support and a layer of bearing material, the bearing support connectable to the bottom ring, and the layer of bearing material surrounding the trunnion, the bearing including at least three segments separately connectable to the bottom ring, each segment including a part of the bearing support and a part of the layer of bearing material, a joint being obliquely formed between the segments with respect to the bearing axis, so that one of the segments has a wedge shape to define a wedge-shaped segment, the wedge-shaped segment being wider in the circumferential direction on a waterside edge of the bearing than on an opposite edge, and the bearing including a bearing seal, and the bearing seal being rotatably fixedly connected to the trunnion, the bearing support including a running surface for a lip of the bearing seal, and an extension of the opening in the bottom ring being dimensioned in such a way that the bearing seal is installable when the segments of the bearing are not connected to the bottom ring and the trunnion is situated in the opening of the bottom ring.

2. The guiding apparatus as recited in claim 1 wherein the at least three segments includes exactly four segments separately connectable to the bottom ring.

3. The guiding apparatus as recited in claim 1 wherein a diameter of the running surface for the lip of the bearing seal is smaller than an inner diameter of the layer of bearing material.

4. The guiding apparatus as recited in claim 1 wherein the bearing support directly abuts the bottom ring only at axial ends of the bearing support.

5. The guiding apparatus as recited in claim 1 wherein the bearing support is made from rustproof material.

6. The guiding apparatus as recited in claim 1 wherein the bearing includes a drain.

7. The guiding apparatus as recited in claim 1 wherein the trunnion includes a tightening chamfer on the end.

8. The guiding apparatus as recited in claim 1 wherein the bearing support is made from bearing material.

9. A method for installing and removing a bearing of a guiding apparatus as recited in claim 1, the method comprising the following steps in the specified order:
    loosening connections between the segments of the bearing and the bottom ring;
    extracting the wedge-shaped segment from the opening of the bottom ring in the direction of the water flow path;
    extracting remaining segments of the segments from the opening of the bottom ring in the direction of the water flow path;
    removing the bearing seal;
    installing the bearing seal;
    inserting the segments extracted as the remaining segments into the opening of the bottom ring from the side of the water flow path;
    inserting the wedge-shaped segment into the opening of the bottom ring from the side of the water flow path; and
    establishing the connections between the segments of the bearing and the bottom ring.

* * * * *